UNITED STATES PATENT OFFICE.

WILLIAM ROSENBERG, OF NEW YORK, N. Y.

LACQUER FOR USE IN SOLDERING.

SPECIFICATION forming part of Letters Patent No. 319,128, dated June 2, 1885.

Application filed April 1, 1885. (No specimens.)

*To all whom it may concern:*

Be it known that I, WILLIAM ROSENBERG, of New York, in the county of New York and State of New York, have invented a certain new and useful Improvement in Lacquers for Use in Soldering, of which the following is a specification.

In the manufacture of metal cans for containing edibles it is customary in soldering the joints of the can to first coat the surfaces of the metal where the joints are formed with muriatic acid in order to furnish better holding-surfaces for the solder. The use of acid is objectionable, because it often impregnates the contents of the can and renders it unwholesome. It is the object of my improvement to obviate this difficulty.

To this end my improvement consists in a lacquer for soldering the joints of metal cans, made of kauri gum, rosin, and alcohol, which lacquer is to be applied to the can previous to the application of the solder. Cans so soldered will not impart a disagreeable taste to the contents, neither will they be in any way detrimental to the same.

Instead of using alcohol alone in combination with the gum and rosin, I may use a mixture of alcohol and benzine therewith, if desirable.

In carrying out my improvement I take, say, about seventy-five (75) pounds of kauri gum, forty (40) pounds of rosin, and twenty (20) gallons of alcohol, and by mixing them together form a lacquer, which I apply with a brush or otherwise to the surfaces of the can where the joints are formed.

In case I employ a mixture of alcohol and benzine with the above proportions of gum and rosin, I prefer to use, say, about fifteen (15) gallons of alcohol to five (5) gallons of benzine.

What I claim as my invention, and desire to secure by Letters Patent, is—

1. A lacquer to be used in soldering, consisting of kauri gum, rosin, and alcohol, substantially as specified.

2. A lacquer to be used in soldering, consisting of kauri gum, rosin, alcohol, and benzine, substantially as specified.

WILLIAM ROSENBERG.

Witnesses:
J. J. FROUTS,
EDWIN D. KALISH.